Sept. 23, 1941.     H. F. KORS     2,256,717
COFFEE MAKER
Filed July 18, 1938
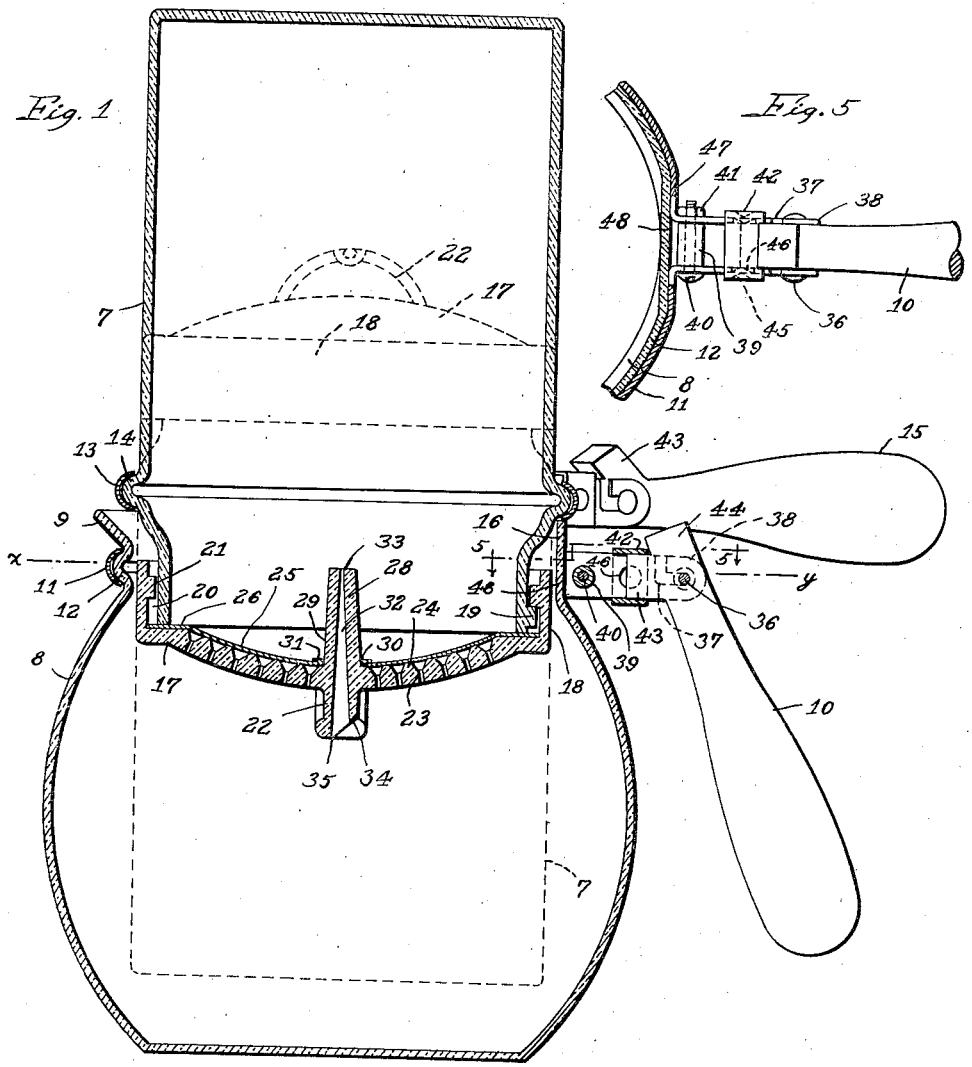
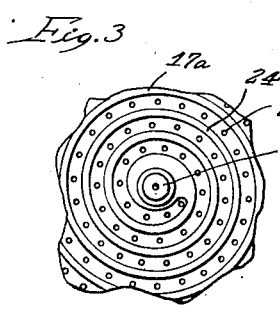
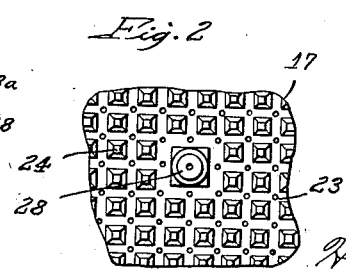
Inventor:
Henry F. Kors
By
McCanna, Wintercorn & Norebach
Attys.

Patented Sept. 23, 1941

2,256,717

UNITED STATES PATENT OFFICE 2,256,717

COFFEE MAKER

Henry F. Kors, Chicago, Ill., assignor, by mesne assignments, to Korwood Incorporated, Independence, Kans., a corporation of Kansas Application July 18, 1938, Serial No. 219,751

6 Claims. (Cl. 53—3)

This invention relates to a new and improved coffee maker.

The principal object of my invention is to provide a double-boiler type of coffee maker wherein the coffee is brewed in the inner container at a temperature best calculated to give good flavor without extracting the undesirable acids and caffeine, and wherein the outer container is so designed that it serves not only as a boiler, but, when emptied, is also the coffee server, the device being otherwise so designed that it may be used not only as a coffee maker, but also for the large variety of uses to which a double-boiler may be put.

A salient feature of my invention is the novel means provided for filtering the coffee from the inner container into the outer container, the filter means being incorporated in the cover on the inner container along with a novel form of air inspirator nozzle which, when the inner container is inverted over the outer container for filtering, allows air to bubble up through the coffee to relieve the vacuum that would otherwise be created, while allowing the coffee to drain only through the filter means.

A special feature is the construction of the cover and inner and outer containers of glass, the cover being preferably formed with grooves or other depressions, leaving spaces between the filter cloth and the small drain holes provided in the bottom of the grooves or depressions, whereby to avoid clogging and consequent slow filtering.

Still another feature is the provision of the air inspirator nozzle in the knob provided on the outside of the cover at the center thereof for use in turning the cover in fastening the same onto the inner container with the filter cloth clamped therebetween, the knob serving also as a means for removing the cover from the container.

The invention is illustrated in the accompanying drawing, in which—

Fig. 1 is a central vertical section through a coffee maker made in accordance with my invention, the inner container being shown in full lines in inverted draining position, and in dotted lines in coffee brewing position;

Fig. 2 is a fragmentary plane view of a portion of the cover for the inner container, looking at the inner side thereof to show the arrangement of spaced filter holes and intermediate projections;

Fig. 3 is a similar view showing a modified or alternative construction;

Fig. 4 is a sectional detail illustrating still another modified or alternative construction, and Fig. 5 is a fragmentary horizontal sectional detail on the broken line 5—5 of Fig. 1.

Similar reference numerals are applied to corresponding parts throughout the views.

Referring first to Figs. 1 and 2, the numerals 7 and 8 designate the inner and outer containers for the double-boiler coffee maker of my invention. Both are illustrated as made of glass, but it should be understood that either or both may be made of aluminum or other material and porcelain enameled, if desired. A pouring lip or spout 9 is provided on the outer container 8, inasmuch as I contemplate having the outer container used as the coffee server in addition to being the boiler. A handle 10 is suitably secured to the container 8 by a metal band clamp 11 fitted on the annular bead 12 provided on the outside of the container 8 near the top. A band 13 similarly mounted on an annular bead 14 on the outside of the container 7 near the open top thereof provides a place for attaching the handle 15 and also serves as a means for supporting the inner container 7 upon the rim 16 of the outer container 8 in either of the positions shown in Fig. 1, the container 7 being shown in dotted lines in brewing position in Fig. 1 and in full lines in inverted filtering position. 17 is the cover for the inner container 7 having an annular rim 18 adapted to fit freely around the open end of the inner container, as shown. The cover 17 is also preferably made of glass to match the containers 7 and 8, but, of course, where other material is used in the containers, the cover will be made of the same material. Bosses 19 formed on the upper end of the inner container have bayonet slots 20 therein opening from the top of the container adapted to receive projections 21 provided on the inside of the rim 18 in the manner indicated in Fig. 1. A knob 22 formed integral with the cover 17 at the center thereof serves as a means for turning the cover to move the projections 21 toward the offset inner ends of the bayonet slots 20.

The cover 17 has a multiplicity of filter holes 23 provided therein located at the corners of a multiplicity of projections 24 of frusto-pyramidal form formed on the inside of the cover. A filter cloth 25 rests against the inside of the cover over these projections 24 with its marginal portion 26 arranged to be clamped between the rim of the container 7 and the cover 17 when the latter is applied to the container in the manner illustrated.

The construction illustrated in Fig. 3 has the holes 23a provided in the spiral groove between consecutive turns of the continuous spiral projection 24a provided on the cover 17a.

If desired, a spacer 27 of wire cloth may be provided between the cover and the filter cloth 25, as shown in Fig. 4, in which event the cover 17b will not require countersinking of the holes 23b.

An air inspirator nozzle 28 projects inwardly from the center of the cover 17 and is of frusto-conical form, so that the tapered surface 29 will have a tight wedging fit in the center hole 30 of the filter cloth 25. The filter cloth has a reinforcing circular hem 31 around the hole 30 formed by the turned over and sewed edges of the material around the hole. An axial hole 32 is provided in the nozzle 28 and extends through the knob 22 for the delivery of air from outside the container 7 to the space above the coffee when said inner container is inverted over the outer container 8 to filter the coffee therein, as illustrated in full lines in Fig. 1. The hole 32 tapers inwardly to provide a restricted air inlet orifice 33 at the inner end of the nozzle 28. The nozzle 28 is elongated sufficiently to insure operating, as hereinafter described, but does not extend beyond the plane of the line x—y which coincides with the plane of the edge of the rim of the cover 17, so as to permit placing the cover on a table or other flat surface resting squarely on the rim 18. The outer end of the nozzle 28, in the knob 22, is cut off at an acute angle with respect to its axis, as indicated at 34, so as to provide a drip point at 35 at one side of the enlarged outer end of the hole 32, from which whatever small amount of coffee that may get into the hole 32 in the inversion of the inner container 7 will be sure to drop off so as not to interfere with free entry of air into the outer end of the hole 32.

In operation, the inner container 7 containing ground coffee along with the appropriate amount of water is placed in the outer container 8, as illustrated in dotted lines in Fig. 1, after enough water has been put in the outer container to boil without danger of overflowing. This double-boiler then brews the coffee in the inner container, and it takes about seven minutes to produce fairly strong coffee. In the brewing process, the liquid in the inner container never reaches a scalding temperature, and I have found that a mellow flavored coffee is obtained free of any of the acrid taste so frequently found in coffee made the old way. The cover 17 with the filter cloth 25 therein may be applied to the inner container either before or after the coffee is brewed; most housewives will undoubtedly prefer applying the cover at the outset. As soon as the coffee is ready for serving, the inner container is removed by means of the handle 15, and the water is poured out from the outer container 8, using handle 10. Then the inner container is inverted over the outer container for the filtering of the coffee into the latter, as shown in full lines in Fig. 1, whereby to produce absolutely clear and most appetizing coffee. When all of the coffee has been filtered, the inner container is removed and a cover (not shown) is applied to the outer container which then is the coffee server. The fact that the outer container is hot when the coffee is filtered into it is obviously advantageous, because the coffee can then be served piping hot, as many prefer it. The filtering process is interesting to watch, and it is for that reason that I prefer to have the containers made of glass, and, of course, the use of glass has still other advantages which are generally appreciated, judging from the increasing extent to which it is being used nowadays for cooking utensils. The interesting phenomenon is the bubbling of air up through the center of the coffee in the container to relieve the vacuum in the space above the coffee while the coffee is discharged in a multiplicity of fine streams from the holes 23 in the cover. I have found that the restricted orifice 33 at the inner end of the tapered nozzle hole 32 apparently has to bear a certain relationship in its area to the combined area of the holes 23, otherwise coffee will flow downwardly through the hole 32, instead of air flowing upwardly therethrough. While there may be some other explanation for this phenomenon, one which I would offer as a plausible explanation is that the air takes the shortest path through the coffee to the vacuum chamber above the coffee in the container, and since the hole 32 terminates at an elevation appreciably above the elevation of the holes 23, due to the length of the nozzle 28, the air naturally takes this path. Another explanation is that there is less frictional resistance to flow of the coffee through the interstices of the filter cloth 25 and through the holes 23 than through the long orifice 32, and therefore the coffee is discharged through the holes 23 instead of through the hole 32. The bevelling off of the outer end of the nozzle 28 at 34 eliminates the danger of a drop of coffee adhering to the end of the nozzle after the container 7 has been placed on the container 8 in the position shown in full lines in Fig. 1 for filtering the coffee from container 7 into container 8. Only a few drops will enter the hole 32 at the time the container 7 is inverted, and by insuring complete drainage thereof from the hole 32, I avoid danger of sealing the container 7 against inlet of air. If air were not permitted to enter through hole 32, the coffee could not be filtered, because there would be no way of relieving the vacuum created inside the container 7 above the level of its liquid contents.

The handles 10 and 15, I would now point out, are alike and interchangeable, both being equipped with a locking pin 36 for entry in the bayonet slots 37 provided in the spaced parallel free ends 38 of the bands 11 and 13. The handle 10, due to the shape of the container 8, has to be mounted farther away from the container than is the case with the handle 15 in relation to the associated container 7. A spacer block 39 is therefore provided between the ends 38 next to the container 8, and a bolt 40 is passed through the ends 38 of the band and through the intermediate spacer block 39 and has a nut 41 threaded on the projecting end thereof to hold the parts in tight rigid relationship while permitting sliding movement of the handle 10 between the ends 38 of the band for entry of the pin 36 into the bayonet slots 37. Sheet metal collars 42 are slidable back and forth on the ends 38 of the bands 11 and 13, and when slid outwardly to the positions shown in Fig. 1, serve by telescoping engagement with the adjacent ends of the handles 10 and 15 to lock the latter in place and prevent turning of the handles about their pins 36 as axes. Each handle has two square or rectangular projections 43 and 44, and when the handle is to be set at the angle as shown by the handle 10, the collar 42 fits over the projections 43, but when the handle is to be set horizontally, like the handle 15, the collar 42 fits over the other projection 44. The opposed side walls of the collar 42 have indented detent portions 45 which when the rollers 42 are in handle-locking position, are received in circular holes 46 provided therefor in the ends 38 of the band in spaced relation to the bayonet slots 11. There is sufficient springiness to the metal of the collars 42 to permit spreading of its opposed side walls for disengagement of the detent portions 45 from the holes 46 when the collars 42 are slid away from the handles 10 and 15 to permit removal thereof, but when the collars 42 are slid back into handle locking position, the detent portions 45 engage in the holes 46 and make for very secure fastenings for the handles.

In closing, it will be noticed that the bands 11 and 13 are both arcuate in cross-section to conform to the rounded peripheries of the beads 12 and 14, respectively. However, near the outwardly bent ends 38, which are flattened, the bands are flattened, as indicated at 47, to engage the flattened portions 48 on the containers defining gaps between the adjacent ends of the beads 12 and 14. The engagement of the flattened portions 47 on the bands 11 and 13 with the flat surfaces 48 on the containers 7 and 8 is sufficient to prevent turning of the bands with respect to the containers, even though the bands may not happen to be mounted very tightly on the containers. If desired, the radius of cross-sectional curvature on the inside of the bands 11 and 13 may be slightly smaller than the radius of sectional curvature of the periphery of the beads 12 and 14, so that each band engages its bead circumferentially on the upper and lower portions of the bead, but there is a slight space left between the middle of the bead and the inside of the band. That permits tightening of the bands much more securely without danger of cracking the glass, even though no intermediate cushioning strip is employed, and, of course, I may provide such if desired. With that construction, as the bands are tightened more and more, their marginal circumferential edge portions are sprung more and more up to the point where the middle portions of the bands come into actual tight engagement with the middle portions of the beads. The resilience in the bands tends to keep them tight at all times.

It is believed the foregoing description conveys a good understanding of the objects and advantages of my invention. The appended claims are drawn with a view to covering all legitimate modifications and adaptations.

I claim:

1. In combination, in a coffee brewer, a container, a removable cover therefor adapted to be secured on the container in closed position, said cover having filtering openings provided therein, and an air nozzle projecting inwardly from the central portion thereof, and a filter cloth of larger diameter than the container adapted to be clamped by its marginal edge portion between the cover and container in position covering the filtering openings in the cover, said filter cloth having a substantially central opening provided therein defined by a turned-over and sewed circular edge portion, said nozzle having a water-tight fit in said opening.

2. As an article of manufacture, a cover for a coffee brewer container, comprising a perforated body adapted to receive a sheet of filtering material on the inner side thereof covering the perforations, and an elongated air inspirator nozzle on said body projecting from the plane of the inner side thereof and adapted to extend through a hole provided therefor in the filtering material, said nozzle having a longitudinal hole provided therein opening to the outer side of said body, and said nozzle projecting from the outer side of said body and having the opening therein terminating in a truncated outer end portion slanted at an acute angle to the axis of the nozzle, substantially as and for the purpose described.

3. As an article of manufacture, a cover for a coffee brewing container, comprising a perforated body adapted to receive a sheet of filtering material on the inner side thereof covering the perforations, and an elongated air inspirator nozzle on said body projecting from the plane of the inner side thereof and adapted to extend through a hole provided therefor in the filtering material, said nozzle having a longitudinal hole provided therein opening to the outer side of said body, and said nozzle having an outer end portion integral with an operating knob projecting from the outer side of said body, the outer end of the nozzle being truncated at an acute angle to the axis thereof and relative to the outer end of the hole in the nozzle, substantially as and for the purpose described.

4. In a coffee brewer, the combination of a first bowl having an annular rim portion defining the open mouth thereof, a second bowl having an annularly projecting bead portion in spaced relation to a reduced annular rim portion which defines the open mouth of the bowl, said annular bead portion being adapted to support the second bowl on the rim of the first bowl with the second bowl fitting inside the first bowl and serving as the inner container of a double-boiler, said annular bead portion being also adapted to support the second bowl on the rim of the first bowl in inverted position in which the reduced rim portion of the second bowl projects downwardly within the rim portion of the first bowl, and a filter head detachably secured to the rim of the second bowl and of small enough diameter to be entered with said rim inside the rim portion of the first bowl, said filter head including an air inlet tube which in the inverted position of the second bowl projects upwardly within the latter, and said first bowl having a pouring spout on the rim portion thereof which in the inverted position of said second bowl provides an air inlet opening for passage of air into the first bowl under the annular bead of the second bowl.

5. In a coffee brewer, the combination of a first bowl having an annular rim portion defining the open mouth thereof, a second bowl having an annularly projecting bead portion in spaced relation to a reduced annular rim portion which defines the open mouth of the bowl, said annular bead portion being adapted to support the second bowl on the rim of the first bowl with the second bowl fitting inside the first bowl and serving as the inner container of a double-boiler, said annular bead portion being also adapted to support the second bowl on the rim of the first bowl in inverted position in which the reduced rim portion of the second bowl projects downwardly within the rim portion of the first bowl, and a filter head detachably secured to the rim of the second bowl and of small enough diameter to be entered with said rim inside the rim portion of the first bowl, said filter head including an air vent which in the inverted position of the second bowl extends above the head within said bowl.

6. In a coffee brewer, the combination of a first bowl having an annular rim portion defining the open mouth thereof, a second bowl having an annularly projecting bead portion in spaced relation to a reduced annular rim portion which defines the open mouth of the bowl, said annular bead portion being adapted to support the second bowl on the rim of the first bowl with the second bowl fitting inside the first bowl and serving as the inner container of a double-boiler, said annular bead portion being also adapted to support the second bowl on the rim of the first bowl in inverted position in which the reduced rim portion of the second bowl projects downwardly within the rim portion of the first bowl, and a filter head detachably secured to the rim of the second bowl and of small enough diameter to be entered with said rim inside the rim portion of the first bowl, said filter head having an elongated vertically disposed air inlet tube thereon which in the inverted position of the second bowl projects upwardly within the latter, said tube providing a relatively restricted opening in the upper end thereof at the upper end of a tapered substantially vertical passage provided in said tube, the enlarged lower end of which opens to the under side of the filter head.

HENRY F. KORS.